(12) United States Patent
Tashiro

(10) Patent No.: US 9,863,514 B2
(45) Date of Patent: Jan. 9, 2018

(54) BALL SCREW APPARATUS

(71) Applicant: JTEKT CORPORATION, Osaka-shi, Osaka (JP)

(72) Inventor: Akiyoshi Tashiro, Yamatotakada (JP)

(73) Assignee: JTEKT CORPORATION, Osaka (JP)

( * ) Notice: Subject to any disclaimer, the term of this patent is extended or adjusted under 35 U.S.C. 154(b) by 397 days.

(21) Appl. No.: 14/806,968

(22) Filed: Jul. 23, 2015

(65) Prior Publication Data

US 2016/0033018 A1 Feb. 4, 2016

(30) Foreign Application Priority Data

Aug. 1, 2014 (JP) .................................. 2014-158166

(51) Int. Cl.
*F16H 25/22* (2006.01)
*F16D 65/18* (2006.01)
*F16D 121/24* (2012.01)
*F16D 125/40* (2012.01)
*F16D 125/48* (2012.01)

(52) U.S. Cl.
CPC ......... *F16H 25/2233* (2013.01); *F16D 65/18* (2013.01); *F16D 2121/24* (2013.01); *F16D 2125/40* (2013.01); *F16D 2125/48* (2013.01); *F16H 25/2204* (2013.01); *F16H 25/2214* (2013.01)

(58) Field of Classification Search
CPC ............. F16H 25/2233; F16H 22/2204; F16D 2121/24; F16D 2125/40; F16D 2125/48
See application file for complete search history.

(56) References Cited

U.S. PATENT DOCUMENTS

| 2,767,593 | A | * | 10/1956 | Hogan | ................. F16H 25/2233 |
| | | | | | 74/424.88 |
| 8,671,789 | B2 | * | 3/2014 | Osterlaenger | ....... F16H 25/2233 |
| | | | | | 188/72.8 |
| 8,800,341 | B2 | * | 8/2014 | Osterlanger | ............ F16D 65/18 |
| | | | | | 192/141 |
| 9,506,542 | B2 | * | 11/2016 | Wu | .......................... F16H 25/20 |
| 9,593,752 | B2 | * | 3/2017 | Adler | .................. F16H 25/2233 |
| 2003/0024337 | A1 | * | 2/2003 | Ohkubo | .............. F16C 33/3706 |
| | | | | | 74/424.82 |
| 2006/0107779 | A1 | * | 5/2006 | Tsou | .................... F16H 25/2214 |
| | | | | | 74/424.88 |

(Continued)

FOREIGN PATENT DOCUMENTS

DE    7 640 810 U1    7/1977
DE      7640180 U1    7/1977

*Primary Examiner* — David M Fenstermacher
(74) *Attorney, Agent, or Firm* — Oliff PLC

(57) ABSTRACT

A ball screw apparatus includes a ball nut through which a ball screw shaft is inserted. A recessed portion is formed in an inner periphery of the ball nut and is recessed so as to extend in a tangential direction of a ball track. A ball train including a plurality of main balls and a coil spring are housed in a raceway. The recessed portion includes a first surface that supports a second end of the coil spring via a stopper ball and a second surface that regulates movement of the stopper ball in a nut axial direction. The second surface is inclined by an angle corresponding to a lead angle of the ball track of the ball nut from an axially perpendicular plane of the ball nut so as extend in the direction of the lead angle.

2 Claims, 7 Drawing Sheets

(56) References Cited

U.S. PATENT DOCUMENTS

| | | | |
|---|---|---|---|
| 2008/0229857 A1* | 9/2008 | Nakazeki | F16H 25/2228 74/424.88 |
| 2009/0283371 A1 | 11/2009 | Winkler et al. | |
| 2010/0206115 A1* | 8/2010 | Jayaram | F16H 19/025 74/424.88 |
| 2012/0018262 A1 | 1/2012 | Winkler | |

* cited by examiner

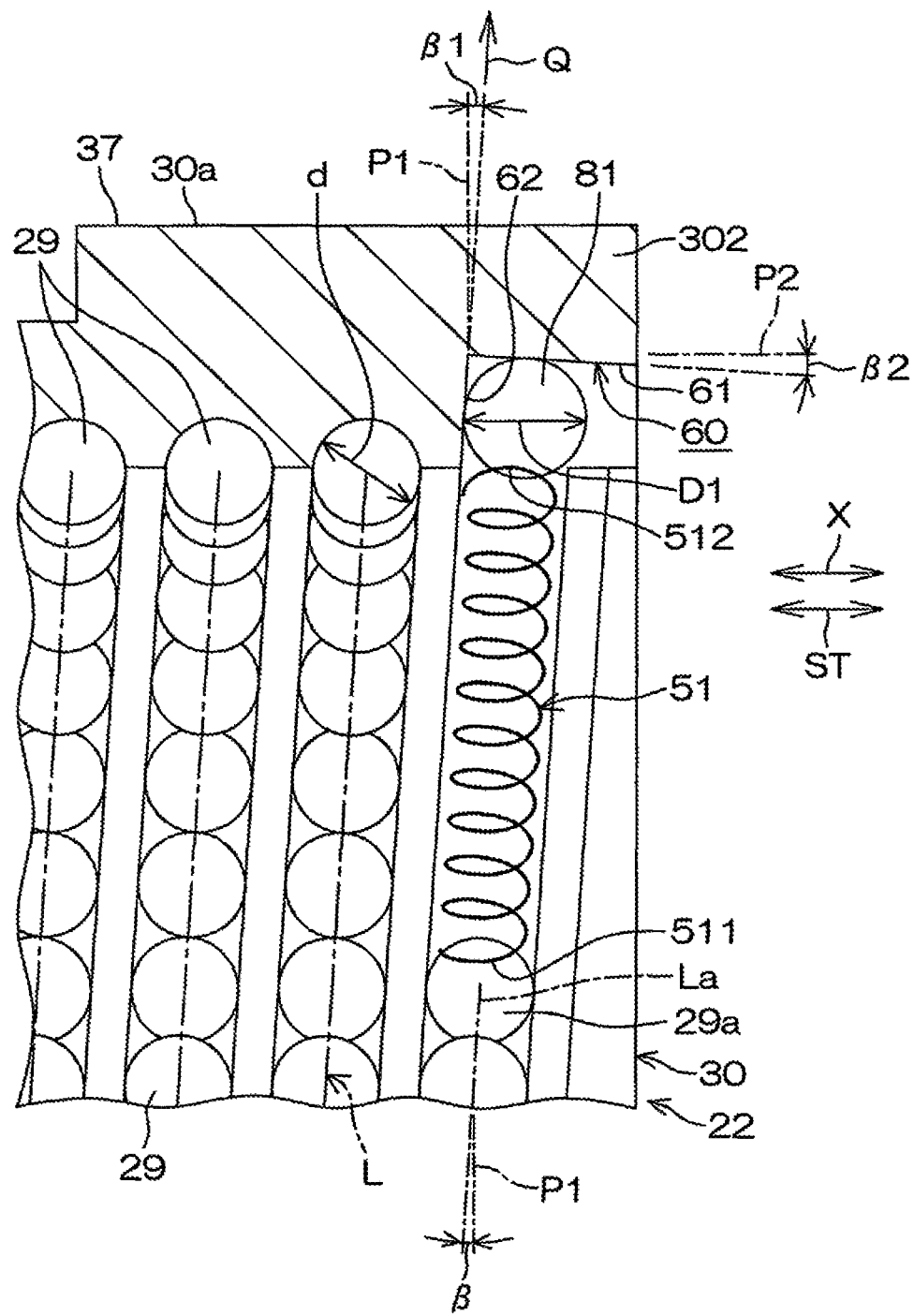

FIRST EMBODIMENT

COMPARATIVE FORM

BALL SCREW APPARATUS

INCORPORATION BY REFERENCE

The disclosure of Japanese Patent Application No. 2014-158166 filed on Aug. 1, 2014 including the specification, drawings and abstract, is incorporated herein by reference in its entirety.

BACKGROUND OF THE INVENTION

1. Field of the Invention

The invention relates to a ball screw apparatus.

2. Description of Related Art

There has been proposed a ball screw apparatus with a ball train interposed between a ball track in an outer periphery of a ball screw shaft and a ball track in an inner periphery of a ball nut. In the ball screw apparatus, a coil spring is interposed between a ball at an end of the ball train and a pocket-like recessed portion formed on the ball nut (see, for example, U.S. Patent Application Publication No. 2012-0018262 A1 (US 2012-0018262 A1)). In such a non-circulating ball screw apparatus, the coil spring does not contract when the ball screw shaft is rotationally driven with a low axial load imposed on the ball screw shaft. Thus, the balls in the ball train do not move relative to the ball nut. Therefore, the ball screw moves with the balls in the ball train sliding on the ball screw shaft.

On the other hand, when the ball screw is rotationally driven with a high axial load imposed on the ball screw shaft, the coil spring contracts to allow the ball screw to move with the balls rolling with respect to both the ball nut and the ball screw shaft. Thus, efficient screw power transmission is achieved.

The coil spring is housed in a raceway between the ball screw shaft and the ball nut. Thus, when the ball screw shaft is rotationally driven, the shape of the coil spring is likely to be distorted. In particular, an end of the coil spring engaged directly with a recessed portion that is a stopper is likely to, for example, come into partial contact with the recessed portion and the position of the end of the coil spring is likely to be unstable. Consequently, the end of the coil spring may move toward the ball screw shaft and interfere with the ball screw shaft.

Thus, the inventors of the present application propose that the end of the coil spring be supported by the recessed portion via a stopper ball so that the orientation of the end of the coil spring is stabilized. Unfortunately, at the time of power transmission, the stopper ball may be caught, like a wedge, between the ball track of the ball screw shaft and the inner surface of the recessed portion of the ball nut, which are inclined in the direction of a lead angle. This may hinder the power transmission.

SUMMARY OF THE INVENTION

An object of the present invention is to provide a ball screw apparatus that allows a stopper ball to be prevented from being caught between a ball screw shaft and a ball nut like a wedge.

According to an aspect of the present invention, a ball screw apparatus includes: a ball nut including an inner periphery, a ball tack formed in the inner periphery, and a recessed portion formed in the inner periphery and recessed so as to extend in a tangential direction of the ball track, the recessed portion serving as a stopper; a ball screw shaft including an outer periphery and a ball track formed in the outer periphery, the ball screw shaft being inserted through the ball nut; a ball train including a plurality of main balls housed in a raceway formed between the ball track of the ball nut and the ball track of the ball screw shaft; a coil spring including a first end that engages with the main ball at an end of the ball train and a second end, the coil spring being housed in the raceway; and a stopper ball held in the recessed portion of the ball nut and engaging with the second end of the coil spring. The recessed portion includes a first surface serving as a bearing surface that supports the second end of the coil spring via the stopper ball and a second surface that intersects the first surface to regulate movement of the stopper ball in a ball nut axial direction. The second surface is inclined by an angle corresponding to a lead angle of the ball track of the ball nut from to an axially perpendicular plane of the ball nut so as to extend in a direction of the lead angle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4 is an enlarged sectional view of an enlarged part of FIG. 3A;

DETAILED DESCRIPTION OF EMBODIMENTS

Figure 1:
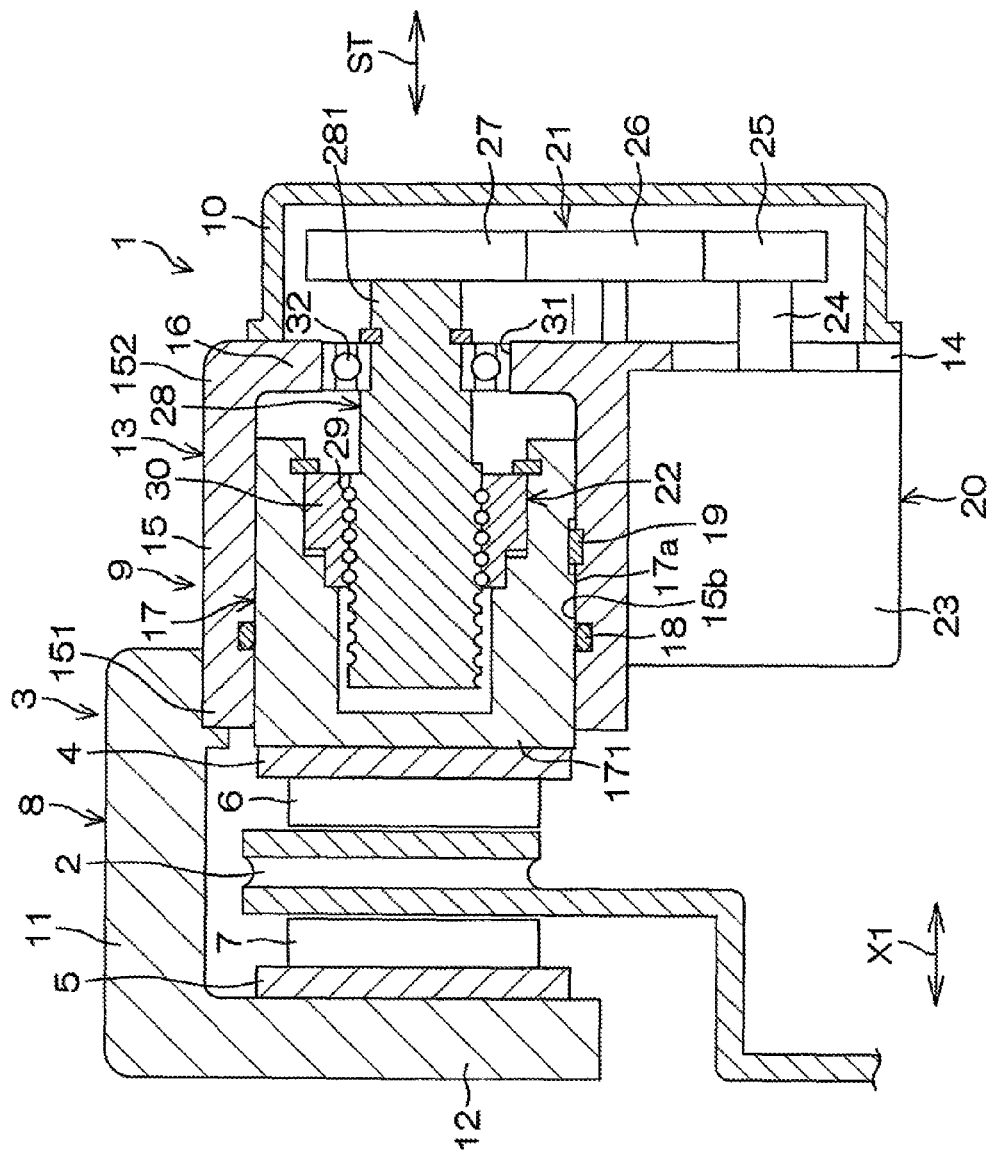
FIG. 1 is a schematic sectional view of a brake apparatus to which a ball screw apparatus of a first embodiment of the present invention is applied, illustrating a non-braking state.

Embodiments of the present invention will be described below in detail with reference to the attached drawings. FIG. 1 is a schematic sectional view of a non-braking state of a brake apparatus 1 to which a ball screw apparatus 22 of a first embodiment of the present invention is applied. The brake apparatus 1 is an apparatus that applies a frictional braking force to a disc 2 rotating integrally with a wheel of an automobile or the like The brake apparatus 1 includes a caliper 3, a first backup plate 4 and a second backup plate 5, and a first pad 6 and a second pad 7. The caliper 3 is movably supported by, for example, a knuckle (not depicted in the drawings). The first backup plate 4 and the second backup plate 5 are disposed so as to sandwich the disc 2 between the first backup plate 4 and the second backup plate 5, and supported by the caliper 3 so as to be able to move closer to and move away from each other. The first pad 6 and the second pad 7 are fixed to the first backup plate 4 and the second backup plate 5, respectively, and can press respective side surfaces of the disc 2.

The caliper 3 includes a first body 8, a second body 9, and a cover 10.

The first body 8 and the second body 9 are fixed together. The cover 10 is fixed to the second body 9. The first body 8 includes a body portion 11 and an arm portion 12. One end of the second body 9 is fixed to the body portion 11. The arm portion 12 is coupled orthogonally to the body portion 11. The second backup plate 5 is fixed to the arm portion 12. The second body 9 includes a cylinder 13 (corresponding to a brake cylinder) and an extension plate 14. The cylinder 13 is fixed to the body portion 11 of the first body 8. The extension plate 14 extends from the cylinder 13.

The cylinder 13 has a first end 151 and a second end 152 that are opposite to each other in an axial direction. The cylinder 13 includes a cylindrical portion 15 that is open at the first end 151 and an end surface plate 16 coupled to the second end 152 of the cylindrical portion 15. A piston 17 (corresponding to a brake piston) that is movable in the axial direction ST is housed in the cylinder 13. An end 171 of the piston 17 protrudes toward the disc 2 through an opening portion at an end of the cylinder 13 (that corresponds to the first end 151 of the cylindrical portion 15) and is fixed to the first backup plate 4.

A seal member 18 is interposed between an outer periphery 17a of the piston 17 and an inner periphery of the cylinder 13 (that corresponds to an inner periphery 15b of the cylindrical portion 15) to seal the gap between the outer periphery 17a and the inner periphery. The seal member 18 may be an O ring housed in a housing groove formed in the inner periphery of the cylinder 13 (the inner periphery 15b of the cylindrical portion 15). The outer periphery 17a of the piston 17 and the inner periphery of the cylinder 13 (the inner periphery 15b of the cylindrical portion 15) are coupled together via a key 19 provided in keyways formed in the outer periphery 17a and the inner periphery. Key coupling using the key 19 allows movement of the piston 17 in the axial direction ST to be guided and also allows rotation of the piston 17 with respect to the cylinder 13 to be regulated.

A hydraulic pressure that biases the piston 17 toward the disc 2 may be supplied into the cylinder 13 through a hydraulic path not depicted in the drawings. In that case, the cylinder 13 and the piston 17 form a hydraulic actuator. The caliper 3 functions to press both of the pads 6 and 7 against the disc 2 to generate a braking force. The caliper 3 includes an electric motor 20, a speed reduction apparatus 21, and the ball screw apparatus 22. The speed reduction apparatus 21 reduces the rotation speed of the electric motor 20. The ball screw apparatus 22 converts rotary motion transmitted from the electric motor 20 via the speed reduction apparatus 21 into linear motion of the piston 17 in the axial direction ST.

The electric motor 20 includes a motor housing 23 and an output shaft 24. The motor housing 23 is fixed to the extension plate 14 of the second body 9. The speed reduction apparatus 21 includes a driving gear 25, an idle gear 26, and a driven gear 27. The driving gear 25 is attached to one end of the output shaft 24 of the electric motor 20 so as to rotate together with the output shaft 24. The idle gear 26 meshes with the driving gear 25. The driven gear 27 meshes with the idle gear 26. The idle gear 26 is pivotally supported by the second body 9 so as to be rotatable. The cover 10 is fixed to the second body 9 so as to cover the speed reduction apparatus 21.

The ball screw apparatus 22 includes a ball screw shaft 28 and a ball nut 30. The ball screw shaft 28 is an input member. The ball nut 30 is a rotatable output member screwed on the ball screw shaft 28 via a plurality of main balls 29. The ball screw shaft 28 is inserted through the ball nut 30. The ball screw shaft 28 is supported by the second body 9 so as to be immovable in the axial direction but to be rotatable. The ball nut 30 is supported by the second body 9 so as to be movable in the axial direction and to be non-rotatable.

Figure 2:
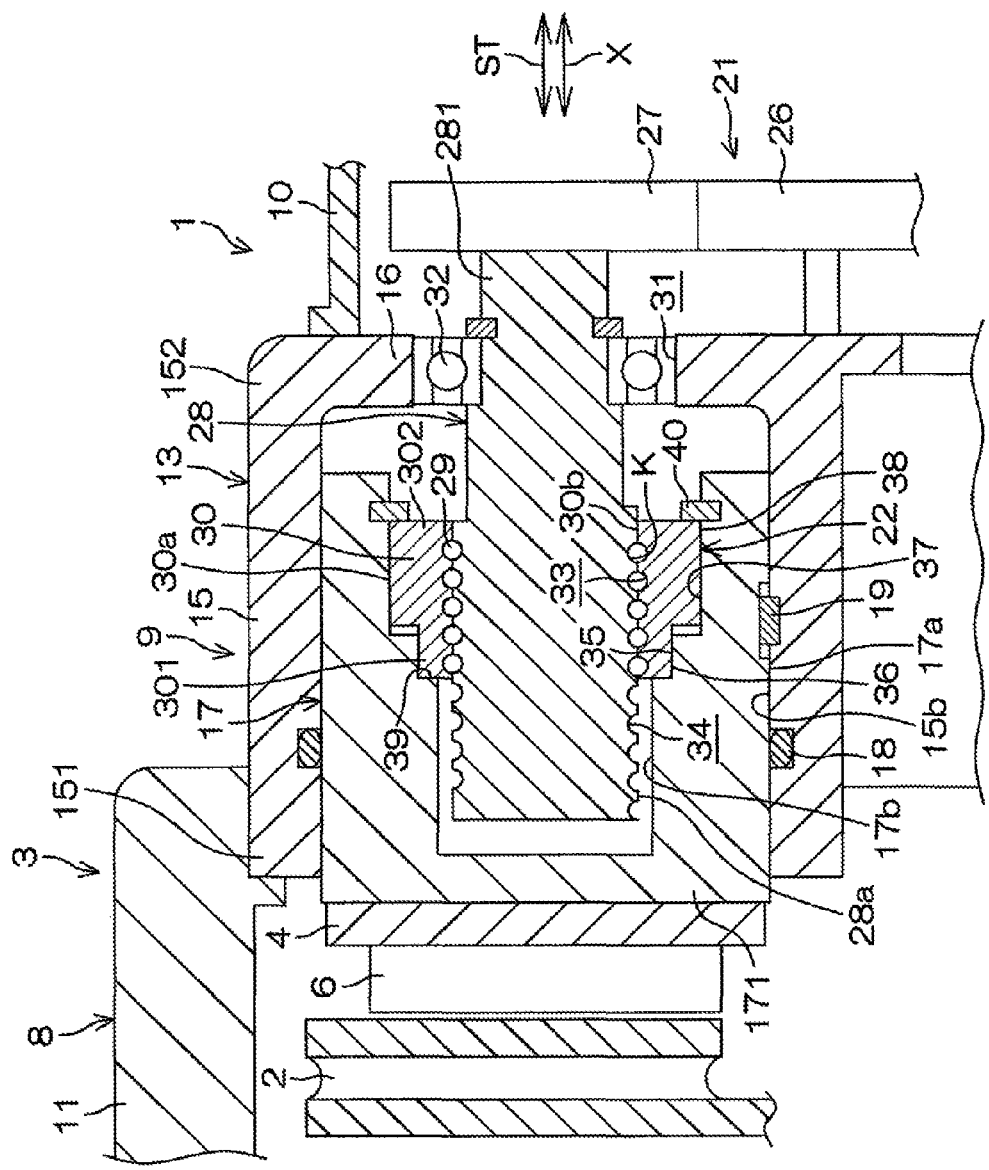
FIG. 2 is an enlarged sectional view of an enlarged part of FIG. 1 depicting the main part of the brake apparatus.

Specifically, the ball screw shaft 28 is supported by a rolling bearing 32 held in a support hole 31 formed in the end surface plate 16 of the cylinder 13 such that the ball screw shaft 28 is rotatable and immovable in the axial direction (axial direction ST). The driven gear 27 is coupled to an end 281 of the ball screw shaft 28 so as to rotate together with the ball screw shaft 28. FIG. 2 is a sectional view of an enlarged part of FIG. 1. As depicted in FIG. 2, the ball nut 30 has an outer periphery 30a and an inner periphery 30b. A ball track 33 is formed in the inner periphery 30b. The ball screw shaft 28 has an outer periphery 28a in which a ball track 34 is formed. The main balls 29 forming a train are interposed between the ball track 33 and the ball track 34.

The outer periphery 30a of the ball nut 30 includes a rotation regulation portion 36 and a cylindrical surface portion 38. The rotation regulation portion 36 is engaged with a rotation regulation portion 35 of an inner periphery 17b of the piston 17. The cylindrical surface portion 38 is fitted on a cylindrical surface portion 37 of the inner periphery 17b of the piston 17. The engagement between the rotation regulation portions 35 and 36 regulates rotation of the piston 17 and the ball nut 30 relative to each other. The ball nut 30 includes a first end 301 closer to the disc 2 and a second end 302 that is on the opposite side from the first end 301, in a ball nut axial direction X.

The first end 301 of the ball nut 30 is in contact with a positioning step portion 39 of the inner periphery 17b of the piston 17. A retaining ring (annular member) 40 fitted in an annular groove formed in the inner periphery 17b of the piston 17 is engaged with an end surface of the second end 302 of the ball nut 30. Thus, the piston 17 and the ball nut 30 are coupled together so as to move together in the axial direction ST (ball nut axial direction X).

Figure 3A:
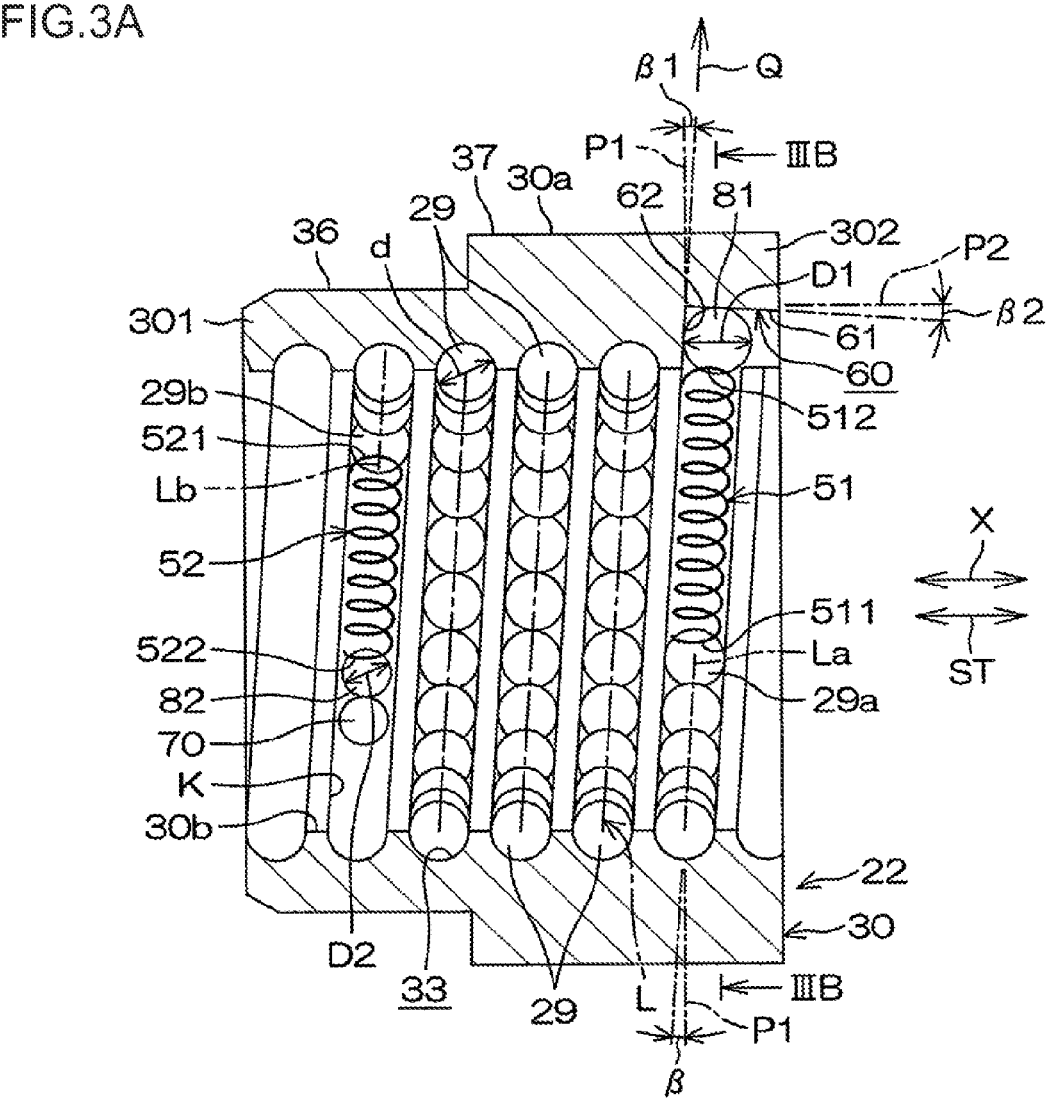
FIG. 3A is a sectional view of the ball screw apparatus in which illustration of a ball screw shaft is omitted.
Figure 3B:
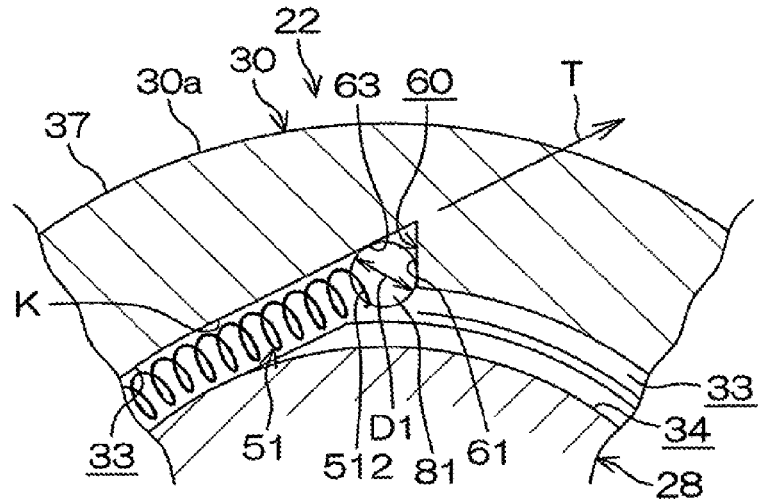
FIG. 3B is a sectional view taken along line IIIB-IIIB in FIG. 3A in which a cross section of the ball screw shaft is illustrated.

When rotation of the output shaft 24 of the electric motor 20 is transmitted to the ball screw shaft 28 via the speed reduction apparatus 21 to rotate the ball screw shaft 28, the ball nut 30 moves in the ball nut axial direction X (axial direction ST). At this time, the piston 17 is guided by the key 19 and moves together with the ball nut 30 in the axial direction ST. FIG. 3A is an enlarged sectional view of the ball nut 30. FIG. 3B is a schematic sectional view taken along line IIIB-IIIB in FIG. 3A. FIG. 4 is an enlarged sectional view of an enlarged part of FIG. 3A.

As depicted in FIG. 3A, the main balls 29 held in the ball track 33 in the ball nut 30 form a ball train L arranged along a raceway K formed between the ball track 33 and the ball track 34. The ball train L includes a first end La and a second end Lb. The ball screw apparatus 22 includes a first coil spring 51 and a second coil spring 52 disposed on the respective opposite sides of the ball train L in the raceway K.

The first coil spring 51 includes a first end 511 and a second end 512. The first end 511 engages with a main ball

29a at a first end La of the ball train L. The second coil spring 52 includes a first end 521 and a second end 522. The first end 521 engages with a main ball 29b at the second end Lb of the ball train L. As depicted in FIG. 3B, a recessed portion 60 serving as a first stopper is formed in the inner periphery 30b of the ball nut 30 so as to extend in a tangential direction of the ball track 33. As depicted in FIG. 3A, the recessed portion 60 is open in the end surface of the second end 302 of the ball nut 30. The recessed portion 60 is formed, for example, by forging in the ball nut axial direction X. The ball screw apparatus 22 includes a stopper ball 81 held in the recessed portion 60. The second end 512 of the first coil spring 51 is supported by the recessed portion 60 via the stopper ball 81.

Figure 5:
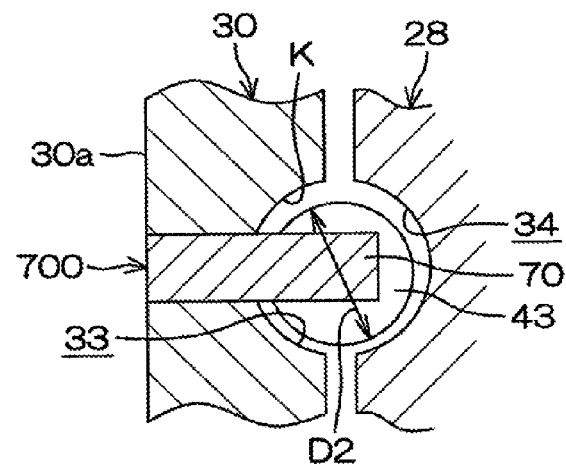
FIG. 5 is a sectional view of the main part of the ball screw apparatus.
Figure 6:
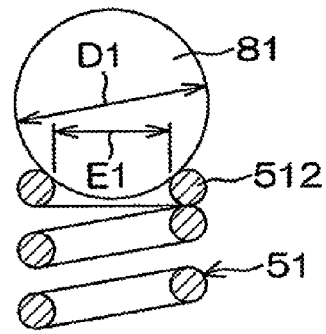
FIG. 6 is a schematic diagram illustrating a relation between a second end of a first coil spring and a corresponding stopper ball.

As depicted in FIG. 3A and FIG. 5, the ball screw apparatus 22 includes a protruding portion 70 that protrudes into the raceway K and that serves as a second stopper. As depicted in FIG. 5, the protruding portion 70 is a part of a stopper pin 700 penetrating the ball nut 30 and is formed by the part of the stopper pin 700 that protrudes into the ball track 33. As depicted in FIG. 6, the diameter D1 of the stopper ball 81 is larger than the inside diameter E1 of an end turn portion of the first coil spring 51 corresponding to the second end 512 (D1>E1). The stopper ball 81 functions to support the first coil spring 51 by being in contact with an inner periphery of the second end 512 (end turn portion) of the first coil spring 51. The diameter D1 of the stopper ball 81 is larger than the diameter d (see FIG. 4) of the main ball 29 (D1>d).

Figure 7:
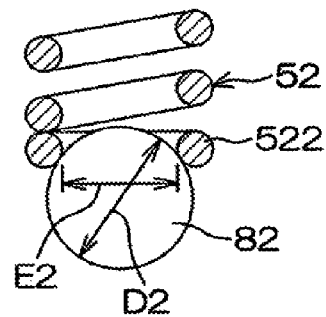
FIG. 7 is a schematic diagram illustrating a relation between a second end of a second coil spring and a corresponding stopper ball.

As depicted in FIG. 3A, the diameter D2 of a stopper ball 82 may be the same as the diameter d of the main ball 29 (D2=d) or may be smaller than the diameter d of the main ball 29 (D2<d). As depicted in FIG. 7, the diameter D2 of the stopper ball 82 is larger than the inside diameter E2 of an end turn portion of the second coil spring 52 corresponding to the second end 522 (D2>E2). The stopper ball 82 functions to support the second coil spring 52 by being in contact with an inner periphery of the second end 522 (end turn portion) of the second coil spring 52.

As depicted in FIG. 3A and FIG. 4, the recessed portion 60 (first stopper) of the ball nut 30 includes a first surface 61 and a second surface 62. The first surface 61 is a bearing surface that supports the second end 512 of the first coil spring 51 via the stopper ball 81. The second surface 62 regulates movement of the stopper ball 81 in the ball nut axial direction X (axial direction ST). As depicted in FIG. 3B, the recessed portion 60 includes a third surface 63 that intersects the first surface 61 and the second surface 62.

As depicted in FIG. 4, the second surface 62 is inclined by an angle β1 corresponding to the lead angle β of the ball track 33 from an axially perpendicular plane P1 of the ball nut 30 so as to extend in a direction Q of the lead angle β (hereinafter referred to as the lead angle direction Q). The first surface 61 and the second surface 62 intersect each other. Specifically, the first surface 61 and the second surface 62 are orthogonal to each other. That is, the first surface 61 is inclined by an angle β2 corresponding to the lead angle β from an axially parallel plane P2 of the ball nut 30.

When the ball screw shaft 28 is rotationally driven with a low axial load imposed on the ball screw shaft 28, the coil springs 51 and 52 do not contract. Thus, the main balls 29 of the ball train L do not move relative to the ball nut 30. Therefore, the ball nut 30 moves with the main balls 29 of the ball train L sliding on the ball track 33. On the other hand, when the ball screw shaft 28 is rotationally driven with a high axial load imposed on the ball screw shaft 28, the coil springs 51 and 52 contract. Thus, the ball nut 30 moves with the main balls 29 of the ball train L rolling with respect to both the ball nut 30 and the ball screw shaft 28. Consequently, efficient screw power transmission is achieved.

Figure 8A:
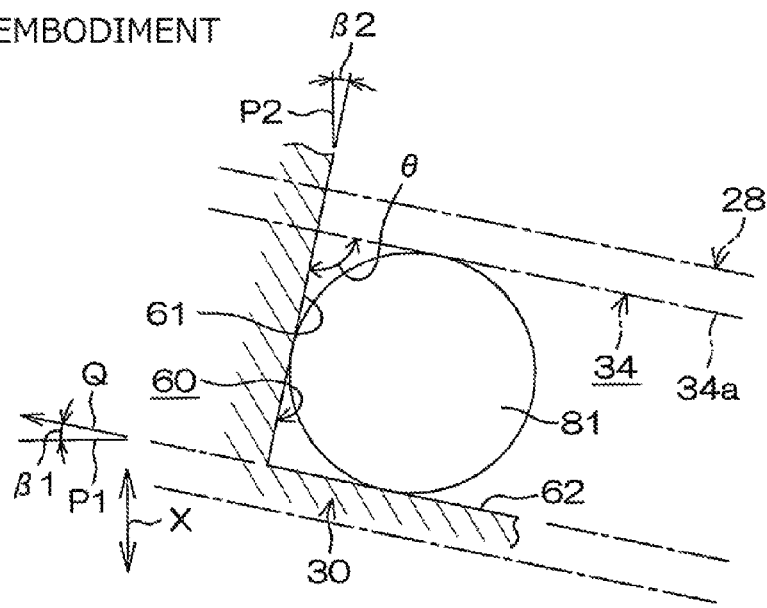
FIG. 8A is a schematic diagram of the structure of a periphery of the stopper ball of the first embodiment.

According to the present embodiment, in the recessed portion 60, the second surface 62 regulating the movement of the stopper ball 81 in the ball nut axial direction X is inclined by the angle β1 corresponding to the lead angle β from the axially perpendicular plane P1 so as to extend in the lead angle direction Q, as depicted in FIG. 8A. Consequently, the second surface 62 and a ridgeline 34a of the ball track 34 of the ball screw shaft 28 are parallel to each other. Therefore, during power transmission, the stopper ball 81 can be suppressed from being caught between the ball screw shaft 28 (ball track 34) and the ball nut 30 (the second surface 62 of the recessed portion 60) like a wedge.

In the recessed portion 60, the first surface 61 serving as a bearing surface that supports the stopper ball 81 is inclined by the angle β2 corresponding to the lead angle β from the axially parallel plane P2. Consequently, the angle θ between the first surface 61 and the ridgeline 34a of the ball track 34 of the ball screw shaft is a right angle (θ=90°). Therefore, during power transmission, the stopper ball 81 can be suppressed from being caught between the ball screw shaft 28 (ball track 34) and the ball nut 30 (the first surface 61 of the recessed portion 60) like a wedge.

Figure 8B:
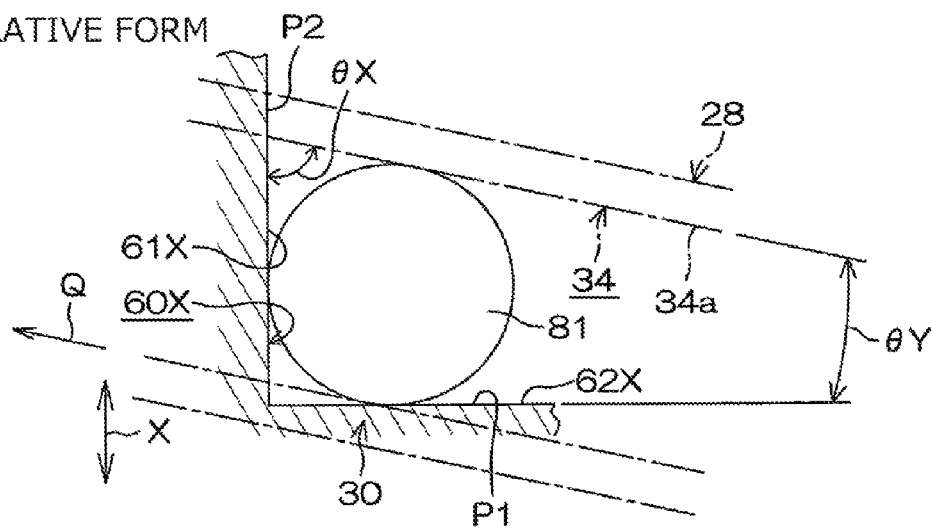
FIG. 8B is a schematic diagram of the structure of a periphery of the stopper ball in a comparative form in which a first surface is an axially parallel plane and a second surface is an axially perpendicular plane.
Figure 9:
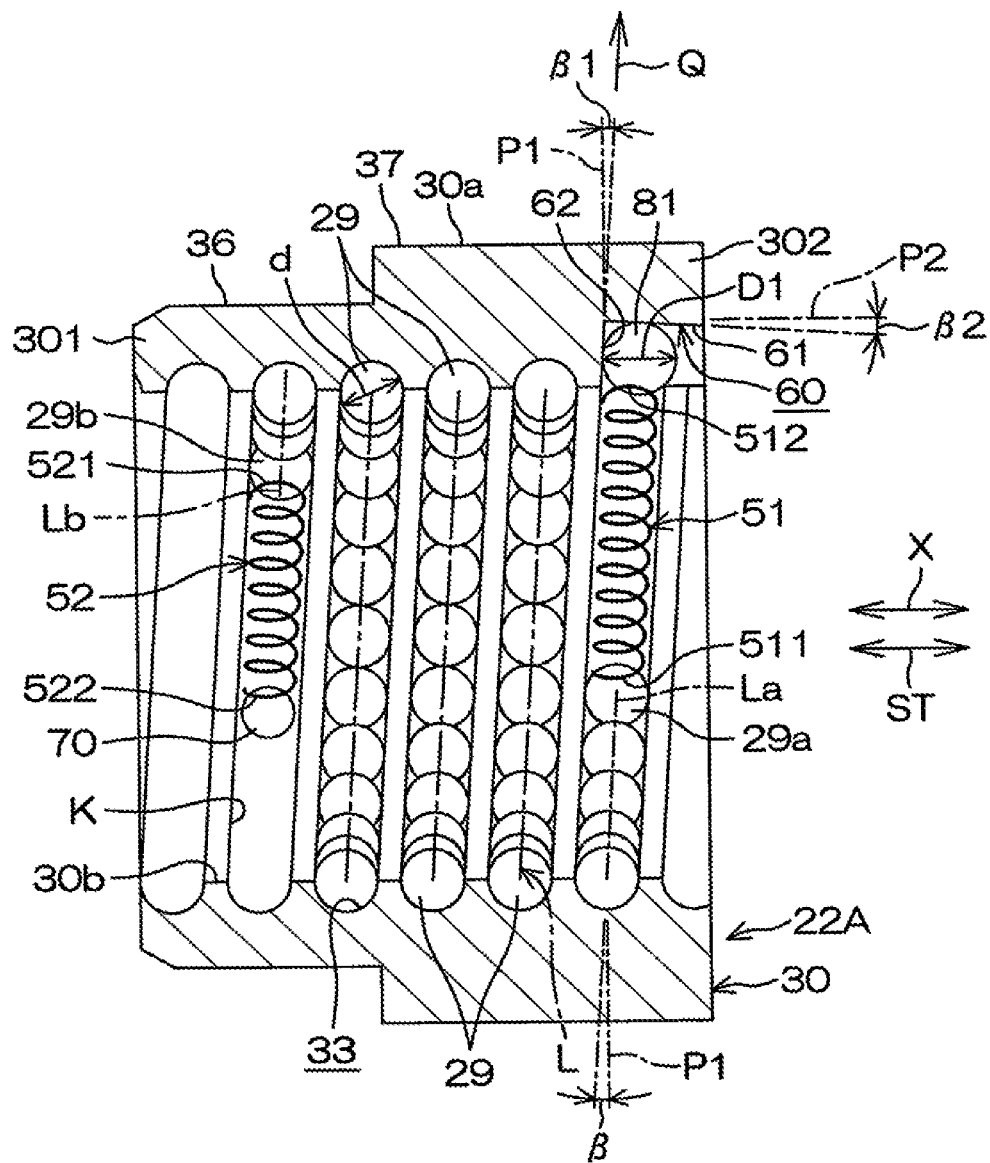
FIG. 9 is a sectional view of a ball screw apparatus of a second embodiment of the present invention in which illustration of the ball screw shaft is omitted.

In contrast, if, in a recessed portion 60X, a first surface 61X extends along the axially perpendicular plane P1 and a second surface 62X extends along the axially parallel plane P2, the following defect is expected to occur. That is, in the comparative form in FIG. 8B, an angle θY between a second surface 62X and the ridgeline 34a of the ball track 34 is an acute angle (θY<90°). Thus, during power transmission, the stopper ball 81 may be caught between the ball track 34 and the second surface 62X like a wedge. Furthermore, an angle θX between the first surface 61X and the ridgeline 34a of the ball track 34 is an acute angle (θX<90°). Thus, during power transmission, the stopper ball 81 may be caught between the ball track 34 and the first surface 61X like a wedge. FIG. 9 is a sectional view of a ball screw apparatus 22A of a second embodiment. In FIG. 9, illustration of the ball screw shaft is omitted. The ball screw apparatus 22A of the second embodiment in FIG. 9 is different from the ball screw apparatus 22 of the first embodiment in FIG. 3A in that the stopper ball 82 is removed and in that the second end 522 of the second coil spring 52 is supported directly by the stopper pin 700.

Components of the second embodiment in FIG. 9 which are the same as those of the first embodiment in FIG. 3A are denoted by the same reference numerals as those in the first embodiment. The second embodiment can also produce the same effects as those of the first embodiment. The present invention is not limited to the above-described embodiments. Although not depicted in the drawings, as the second stopper that supports the second end 522 of the second coil spring 52 via the stopper ball 82, the same configuration as that of the recessed portion 60 serving as the first stopper may be used instead of the protruding portion 70.

Furthermore, although not depicted in the drawings, a possible variation of the second embodiment in FIG. 9 is an example in which the second coil spring 52 is removed and the main ball 29b at the second end Lb of the ball train L is supported directly by the protruding portion 70. Alternatively, a third coil spring (not depicted in the drawings) may be interposed at one or more positions in an intermediate portion of the ball train L. Various other modifications may be made to the present invention within the scope of the invention.

What is claimed is:

1. A ball screw apparatus comprising:
a ball nut including an inner periphery, a ball track formed in the inner periphery, and a recessed portion formed in the inner periphery and recessed so as to extend in a tangential direction of the ball track, the recessed portion serving as a stopper;
a ball screw shaft including an outer periphery and a ball track formed in the outer periphery, the ball screw shaft being inserted through the ball nut;
a ball train including a plurality of main balls housed in a raceway formed between the ball track of the ball nut and the ball track of the ball screw shaft;
a coil spring including a first end that engages with the main ball at an end of the ball train and a second end, the coil spring being housed in the raceway; and
a stopper ball held in the recessed portion of the ball nut and engaging with the second end of the coil spring, wherein
the recessed portion includes a first surface serving as a bearing surface that supports the second end of the coil spring via the stopper ball and a second surface that intersects the first surface to regulate movement of the stopper ball in a ball nut axial direction, and
the second surface is inclined by an angle corresponding to a lead angle of the ball track of the ball nut from an axially perpendicular plane of the ball nut so as to extend in a direction of the lead angle.

2. The ball screw apparatus according to claim 1, wherein the first surface is inclined by an angle corresponding to the lead angle from an axially parallel plane of the ball nut.

* * * * *